E. S. CHURCH.
CASH AND CREDIT REGISTER.
APPLICATION FILED AUG. 2, 1907.
1,036,565.
Patented Aug. 27, 1912.
6 SHEETS—SHEET 2.
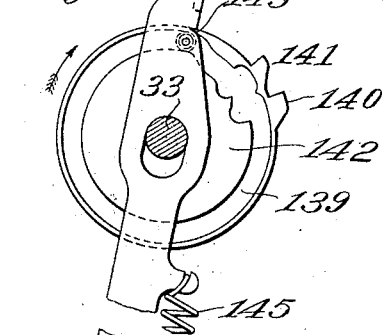
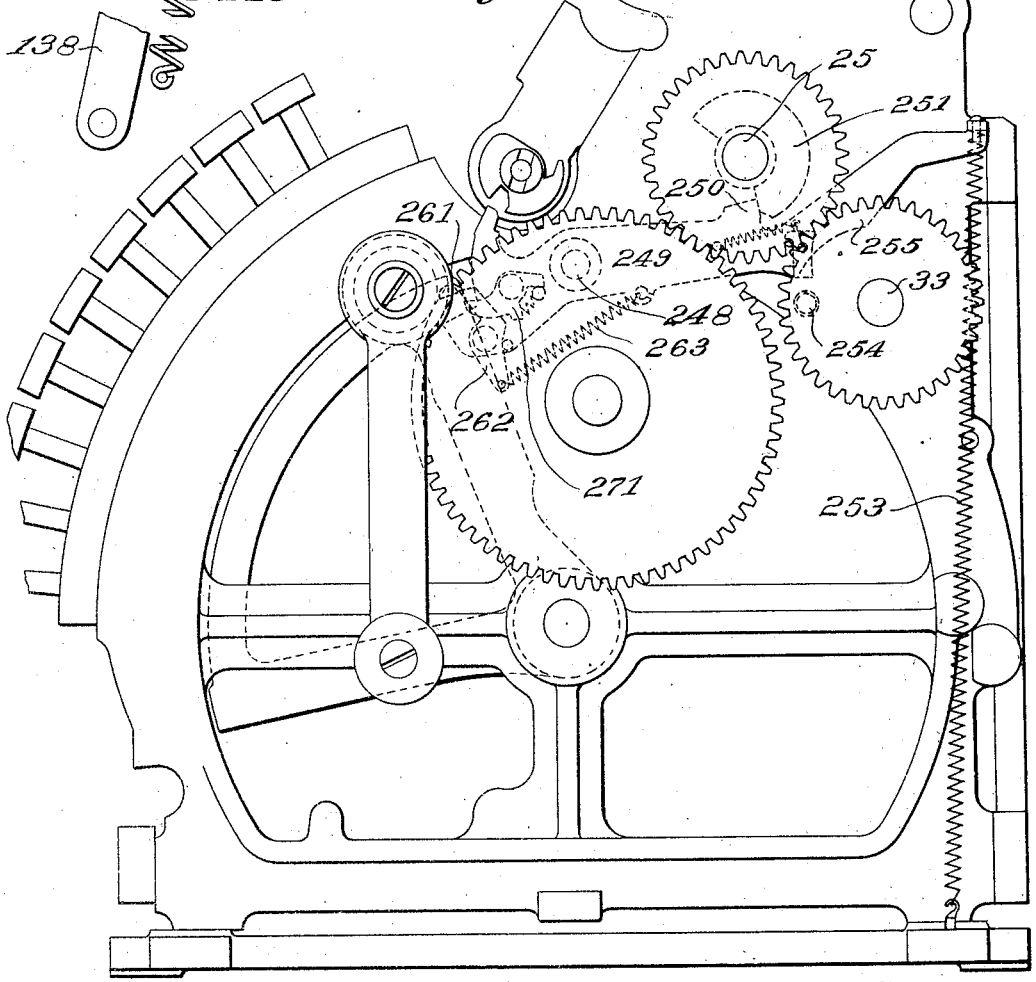

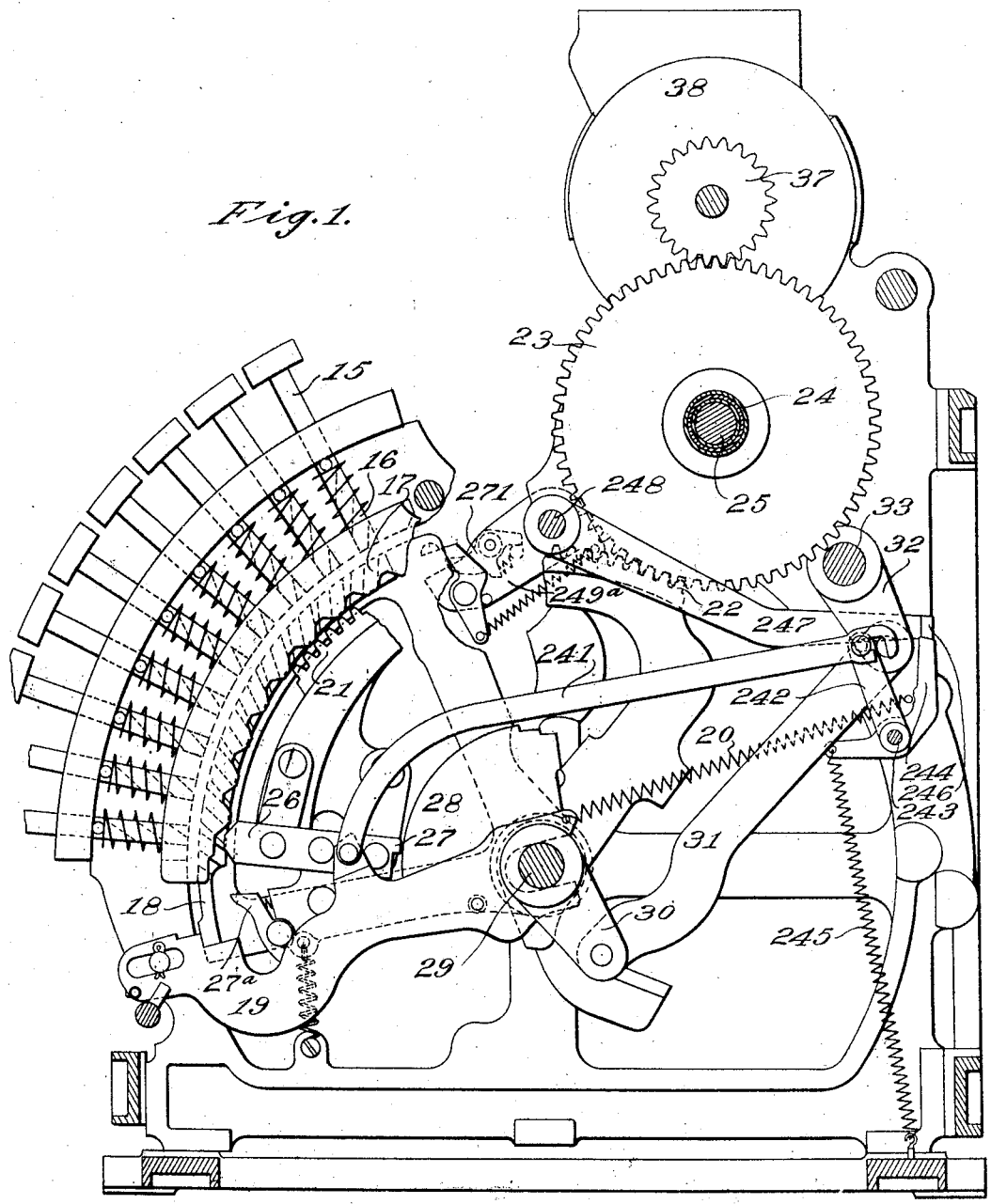

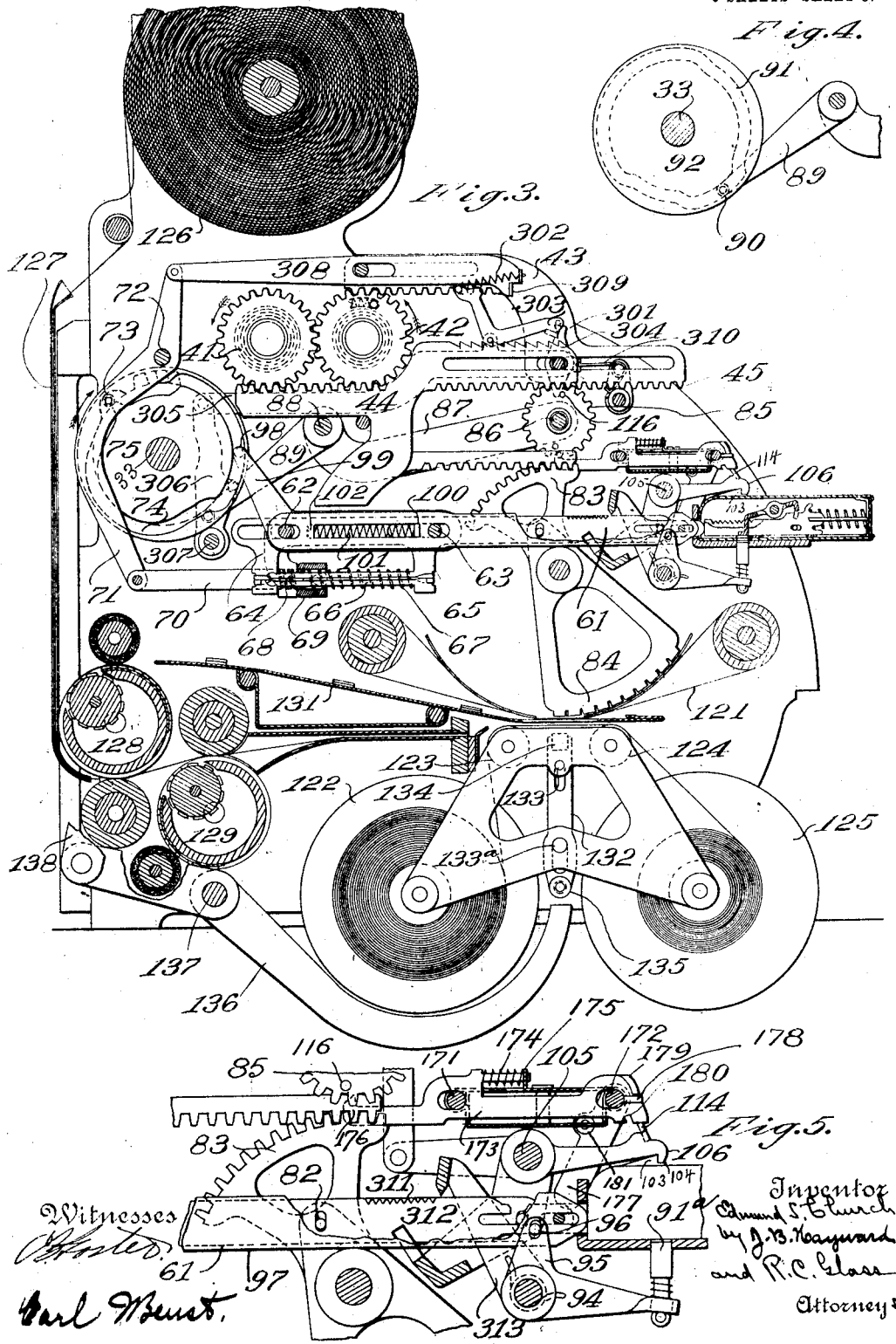

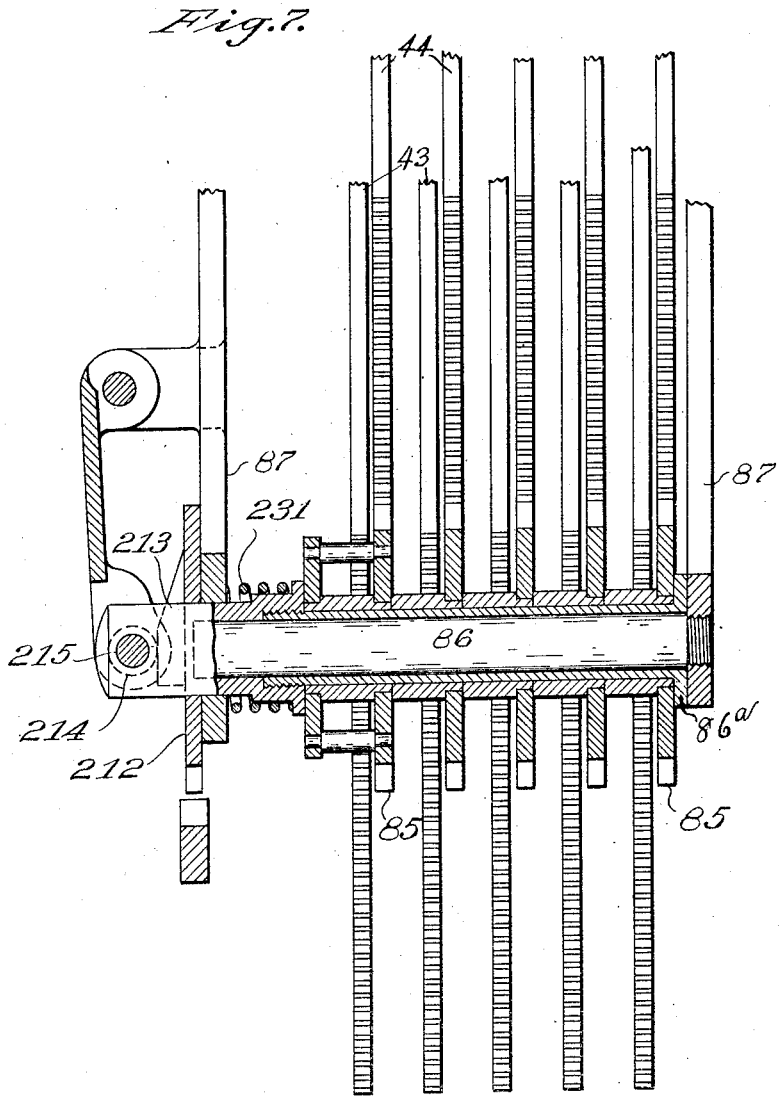

E. S. CHURCH.
CASH AND CREDIT REGISTER.
APPLICATION FILED AUG. 2, 1907.
1,036,565.
Patented Aug. 27, 1912.
6 SHEETS—SHEET 5.
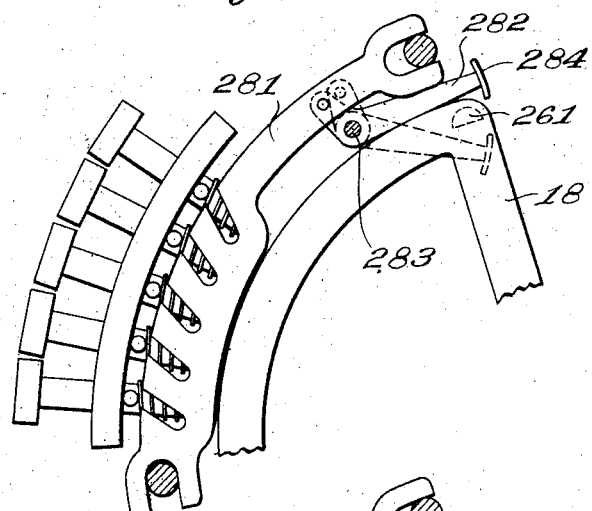
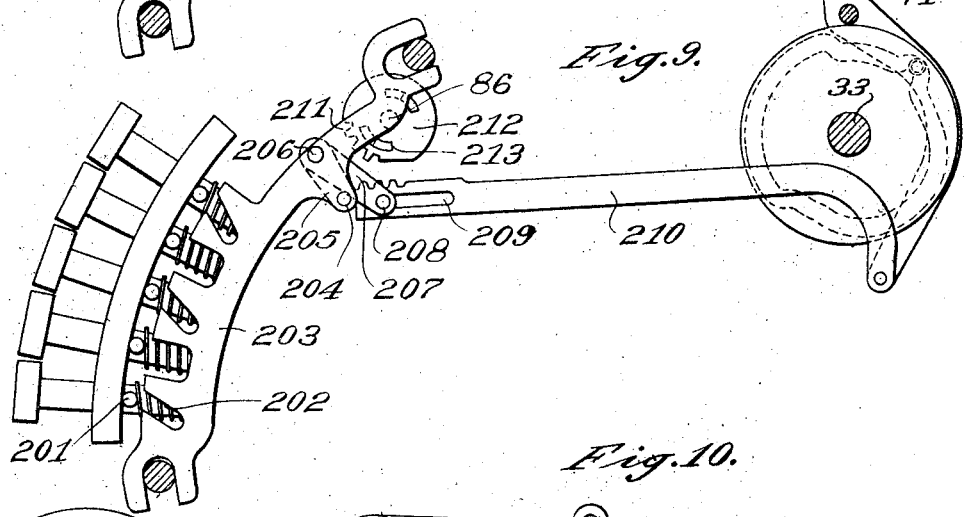
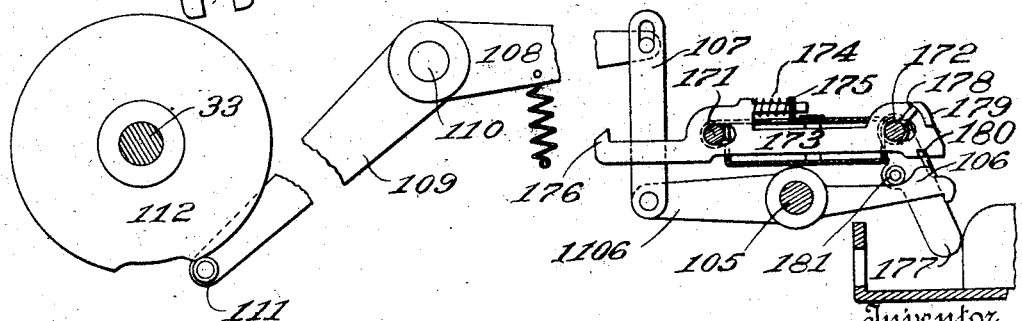
Witnesses
Inventor
Attorneys

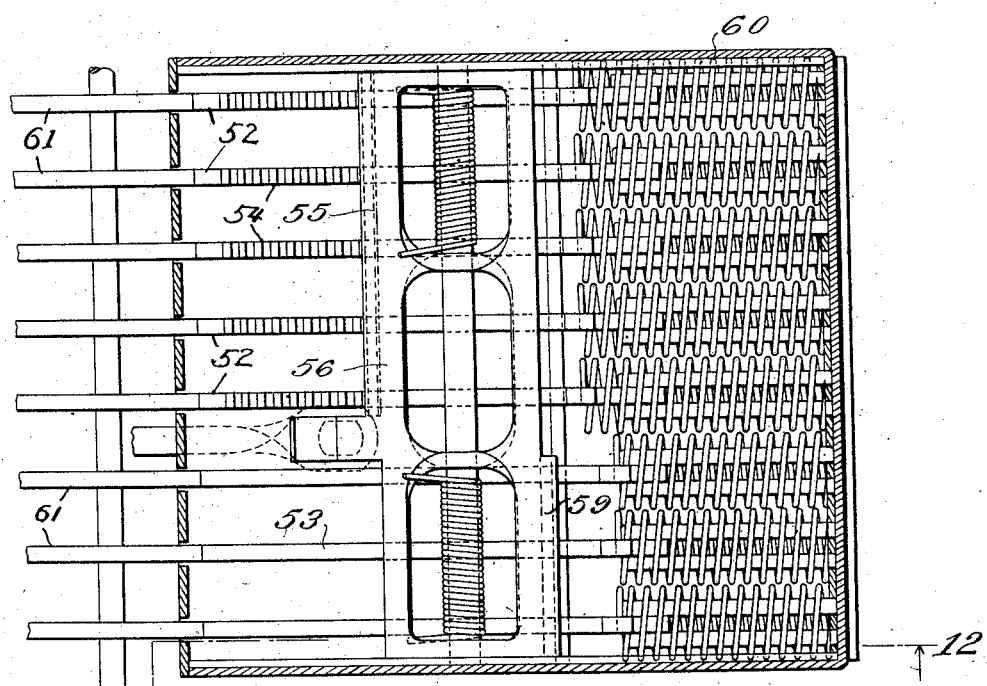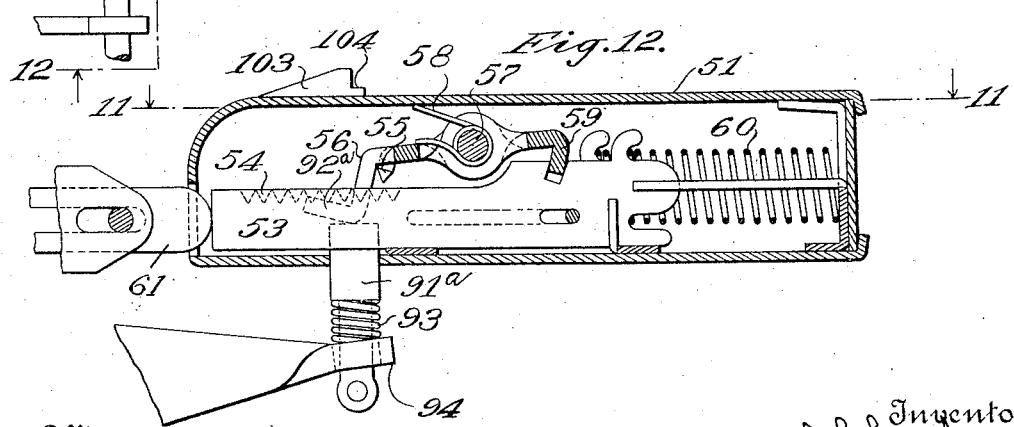

UNITED STATES PATENT OFFICE.

EDMUND S. CHURCH, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH AND CREDIT REGISTER.

1,036,565.   Specification of Letters Patent.   Patented Aug. 27, 1912.

Application filed August 2, 1907. Serial No. 386,787.

*To all whom it may concern:*

Be it known that I, EDMUND S. CHURCH, a citizen of the United States, residing at Dayton, in the county of Montgomery and State of Ohio, have invented certain new and useful Improvements in Cash and Credit Registers, of which I declare the following to be a full, clear, and exact description.

This invention relates to cash and credit registers and has for its main object to provide an improved mechanism of the class described, adapted to coöperate with any one of a plurality of removable entry retaining devices. The present case shows an improved construction of machine adapted to coöperate with such retaining device, as well as certain improvements in construction of the retaining device itself. An error device is provided whereby removal of the retaining device is prevented under certain conditions.

Another object is to provide an improved construction of adding and subtracting machines, wherein a registering device may be moved in either direction as desired.

A further object is to provide an improved mechanism for normally locking a cash or other register, with means for releasing the locking means.

Another object is to prevent manipulation of the machine by preventing the depression of a key in one bank, during the partial operation of a key in another bank.

With these and incidental objects in view, the invention consists in certain novel features of construction and combination of parts, the essential elements of which are set forth in appended claims and a preferred form of embodiment of which is hereinafter described with reference to the drawings which accompany and form part of this specification.

Of said drawings: Figure 1 is a transverse vertical section through the machine, showing the bank of initial or clerk's keys. Fig. 2 is a side elevation of the machine, showing the operating mechanism and locking means therefor. Fig. 3 is a transverse vertical section, showing the printing mechanism and the means for controlling the removable entry retaining device. Fig. 4 is a detail showing the cam for operating the sub-counter. Fig. 5 is an enlarged detail of parts shown in Fig. 3, showing especially the error device. Fig. 6 is a detail of the platen operating cam. Fig. 7 is an enlarged horizontal section, showing the sub-counter and its operating racks, together with means for shifting the counter. Fig. 8 shows a device for preventing depression of an initial key, while a transaction key is partially operated. Fig. 9 shows a mechanism for shifting the counter to subtract. Fig. 10 shows an enlarged detail of the error device. Figs. 11 and 12 are respectively enlarged horizontal and vertical sections of the removable entry retaining device, Fig. 11 being a section on line 11—11 of Fig. 12 and Fig. 12 a vertical section on line 12—12 of Fig. 11.

It may be stated at the outset that this invention is shown as applied to a type of machine now well known on the market, but it will be evident that its adaptation is not limited to this particular style of machine. The type of machine to which this invention is shown as applied is fully described in Letters Patent of the United States issued April 13, 1897, to Cleal and Reinhard and numbered 580,378, to which reference may be made.

Described in general terms the machine includes banks of depressible keys which are adapted to control the movement of the differential segments. These segments serve through gearing and nested sleeves differentially to adjust a series of printing segments, from which an impression is taken on the detail strip, the various movements being caused by an operating handle.

In the present improvement the Cleal and Reinhard mechanism is largely used, but instead of the printing segments there has been substituted a series of gears meshing with counter operating racks. A sub-counter is provided adapted to engage the racks to have amounts added thereon. This sub-counter is mounted in a frame which is vertically shiftable to withdraw the counter from gear with the racks and bring it into gear with racks on certain printing segments. The removable entry retaining device comprises a casing having therein a plurality of denominational slides and identifying slides, the slides being normally locked in any one of a plurality of positions. When an entry is desired, the entry retaining device is inserted in the machine, the printing segments are allowed to move until certain controlling parts thereof engage the various denominational slides of the entry retaining device and then when the printing segments are returned to normal position the subcounter is placed in gear therewith and the amount on the entry retaining device transferred thereto. The sub-counter is then raised into gear with the sliding racks and differential movement given thereto which is finally transferred to the printing segments and the entry retaining device. The platen serves to take an impression from the printing segments after they are finally set, and the segments are ultimately returned to normal position.

The operating mechanism of the machine is normally locked and is released by the depression of one of the bank of initial keys. This depression serves to release the machine and to prevent as well the subsequent depression of any amount key, although the amount keys may previously be depressed as desired.

Under certain conditions a manipulation of the machine may result if one of the usual transaction keys is partly depressed and held in this position while the initial keys are depressed. To prevent this, mechanism under control of the transaction keys is provided which engages the initial key detent and prevents movement thereof while the transaction key is in a partially operated position.

Referring to the drawings it will be seen that Fig. 1 shows a bank of keys 15 provided with cam lugs 16 which engage cam slots 17 in a detent plate 18 when the key is depressed, thereby elevating the said detent plate out of the path of a sliding detent plate 19 which then immediately springs rearward under the impulse of a spring 20 connecting it to the main frame. Directly in the rear of the bank of keys is a segment 21 provided with rack teeth 22 meshing with a gear 23, on one of a series of nested sleeves 24 surrounding a shaft 25. Mounted on the segment 21 is a latching mechanism 26 controlled by a pivoted pawl 27ª which is also mounted on the segment 21 and is adapted to engage and be stopped by a depressed key. The rear end of the latch 26 is provided with a projection 27 engaging a notch on a segment 28 rigidly fastened on a shaft 29 and operated through a crank 30, connecting the said shaft to a link 31 which is operated by a crank 32 on a main operating shaft 33. This mechanism is shown in the patent referred to and is adapted to give a differential movement to the segment 21 at the operation of the machine. When the shaft 33 is rotated by the crank handle, the shaft 29 is given an oscillation through about ninety degrees, carrying the segment 28 first downwardly and then upwardly, and if the segment 21 has been moved from normal position at the previous operation of the machine, it will be restored to normal position and then as the segment 28 returns upward, the notch thereof will engage the projection 27 of the latch 26 and elevate the same until the pawl 27ª engages the depressed key and stops the segment 21. The gear 23 which as stated meshes with the rack teeth 22 is also geared to pinion 37 moving with an indicator 38. This differential mechanism has been described in the singular as only the one bank of keys is shown on this figure, but it will readily be understood that a plurality of banks are used in the machine and that each controls mechanism precisely similar to that shown in the figure. In the patent referred to, on the other end of the nested sleeves 24 are provided printing segments. In the present machine there is substituted for said segments a series of pinions, not shown, which are arranged (through nested sleeves shown in Fig. 3 and indicated by reference numeral 41) to cause a motion of a series of gears 42 corresponding to the amount of movement of the various differential segments 21. These gears 42 each mesh with a pair of racks 43 and 44 one above the gear and one below, so that any movement of the gears 42 causes a movement in opposite direction of the racks 43 and 44. The rack 43 as shown is bent downwardly and provided on its underside, as is the rack 44, with a set of rack teeth 45. These racks are best shown in Fig. 7, from which it will be seen that each pair of racks meshing with a gear 42 are in close lateral arrangement.

The mechanism described in the preceding paragraphs is substantially like that shown in the prior pending application, Serial No. 338,502, filed on Oct. 11, 1906, by Edmund S. Church, and the removable entry retaining device referred to is also shown more or less like that shown in the said application. This entry retaining device is best shown separately in Figs. 11 and 12 and comprises a casing 51 mounted in which is a series of five denominational slides 52 and three identifying slides 53. The denominational slides have each ten locking and alining notches 54 on their upper surface, any one of which is adapted to be engaged by a sharp projection 55 of a latch plate 56. This plate is journaled on a rod 57 and is normally pressed by spring 58 to a position to lock the denominational slides. The latch plate 56 at its rearward extremity is curved downward at 59 thus as a whole providing a locking device for alternately locking the denominational and the identifying slides. The latching mechanism is shown in normal position in Fig. 3 and is moved therefrom by means hereafter described to release the denominational slides 52 and lock the identifying slides 53. Each of the slides 52 and 53 is provided with a coiled spring 60 at its rearward end tending to throw the same forward when not restrained by sharpened projection 55 or the rearward projection 59 of the latching plate 56.

As in the prior application referred to, the denominational slides in the entry retaining device are adapted to control the movement of certain slides which are moved with the printing segments. These slides 61 (Figs. 3 and 5) are carried by stationary pins 62 and 63 and have each two depending projections 64 and 65 connected by a bar 66, surrounded by two springs 67 and 68 between which is a sliding frame or angle iron 69. The frame 69 is mounted to slide on the bars 66 and is moved by links 70 connecting the opposite ends of the angle piece 69 to levers 71, pivoted at 72 and provided with anti-friction rollers 73 riding in grooves 74 of a cam disk 75 mounted on the main operating shaft 33. It will be seen from Fig. 3 when the shaft 33 starts to rotate in the direction of the arrow that the angle piece 69 will be moved rapidly forward, immediately after the shaft 33 begins to rotate. This movement clearly will compress the springs 66, surrounding bars 67 and will soon tension them enough to overcome the inertia and weight of the denominational slides 61 and will then throw such slides forward until they engage and are stopped by the denominational slides of the entry retaining device. Connected to said denominational slides 61 by pins 82 are rack segments 83 carrying printing segments 84, the said rack segments being adapted to engage and operate a sub-counter 85.

The sub-counter 85 is carried on a sleeve 86ª surrounding a shaft 86 and comprises a set of denominational accumulating wheels. The shaft 86 and sleeve 86ª are supported by arms 87 comprising a frame which is pivoted on a rod 88 and provided with rearwardly extending arms 89 shown separately in Fig. 4 which have anti-friction rollers 90 at their rear ends, riding in cam grooves 91 in disk 92, rigidly mounted on shaft 33. It will be seen from the shape of the cam groove 91 in Fig. 4 that very soon after the shaft 33 starts to rotate the anti-friction roller 90 will be moved upwardly, thereby depressing the sub-counter enough to bring the accumulating gears into mesh with the segment gears 83, but it will be noted that this does not occur until the anti-friction roller 73 on the levers 71 has thrown completely forward the angle piece 69 and has consequently moved the denominational slides 61 until they engaged and were stopped by the denominational slides 52 in the entry retaining device. When the angle piece 69 moves rearwardly again, which occurs immediately after the sub-counter 85 is depressed, the denominational slides 61 are returned to normal position, thereby again tensioning springs 68 and setting up on the sub-counter 85 the amount previously carried by the slides of the entry retaining device. During the further operation of the machine the sub-counter is again raised into gear with the racks above it which racks have been meanwhile restored to their zero position, and the racks are again actuated to a position depending on and corresponding with the amount entered on the register keys. Their movement will cause a corresponding movement of the sub-counter accumulating wheels so that the register wheels will then assume a position indicating the algebraic sum of the amount previously on the entry retaining device and the amount due to the keys depressed. The phrase "algebraic sum" is used for the reason that one of the sets of racks above the sub-counter is used to subtract and the other set to add, so that it is possible to either add or subtract from the amount already on the sub-counter, the amount indicated on the register keys, thereby leaving the accumulating wheels in a position depending on the algebraic sum of the two amounts.

As soon as the amount previously set up on the denominational slides 52 of the entry retaining device has been transferred to the denominational slides 61 and thereby to the sub-counter there is no further need of keeping the said slides 52 in their adjusted position and the latching plate 56 is thereby moved to release the slides so that they may be set to their new position at the end of the operation. To release the said slides the plunger 91ª is provided engaging under flange 92ª of the latching plate 56 and surrounded by a spring 93 engaging a shoulder of the plunger and also engaging one arm 94 of a bell crank lever, the other arm 95 of which is connected by a pin 96 to a rearwardly extending slide 97, having an anti-friction roller 98 (Fig. 3) engaging a cam on the main operating shaft 33 to operate the same. The shape of the cam groove in which the anti-friction roller 98 rides is such that the bar 97 is moved slightly rearward, after the sub-counter has been set for the first amount, enough to elevate the plunger 91 to release the latching plate 56, and as explained in the prior application the rearwardly extending projection 59 of the latching plate 56 then engages and locks the identifying slides 53. When the plunger causes the sharpened projection 55 to move away from the notches 54 of the slides 52, they are then released and will move forward under the impulse of their springs 60 to the position of Figs. 11 and 12, which is their zero position. Near the end of the operation the denominational slides 61 are again moved forwardly, causing the denominational slides 52 in the retaining device to move to an equal extent, and the slides 52 are then locked in this position when the plunger 91ᵃ descends and allows the sharpened projection 55 to again engage the notches 54 of the slides.

The description of the plunger release mechanism has left it to be inferred that the anti-friction roller 98 is rigidly connected to the slide 97, but to enable the device to operate easily the slide 97 is made separate from the part 99 carrying the anti-friction roller 98 and is arranged to be controlled by the part 99 through a spring connection. Turned up from the bar 99 is a flange 100 against which presses a spring 101 confined between the flange and a similar flange 102 on the slide 97. With this construction when the shaft 33 is rotated the anti-friction roller 98 moves the bar 99 rearwardly, it then riding on the pins 62 and 63 and tensioning the spring 101 which will cause the slide 97 to move rearwardly, thereby elevating the plunger 91 to release the entry retaining device.

When the entry retaining device is pushed into the machine it is desirable to provide means for locking the device in adjusted position both to insure accuracy in the operation and to prevent the premature release of the device. With this end in view the casing 51 of the entry retaining device is provided with an upwardly extending lug 103 having a notch 104 at its rear end. Mounted rigidly on a shaft 105 is a latching arm 106 adapted as shown in Figs. 3 and 5 to engage the notch 104 of the lug 103 and lock the entry retaining device in its inner or adjusted position. Fig. 10 shows the position of the latching arm 106 and the operating parts therefor when the entry retaining device has been removed from the machine, and it will be seen from this figure that also rigidly carried on shaft 105 is a rearwardly extending arm 1106 having loose connection through a link 107 to a bell crank lever comprising arms 108 and 109, journaled on a pin 110 and provided at the rear end of the arm 109 with an anti-friction roller 111 engaging the peripheral surface of a cam 112 mounted to rotate on shaft 33. It will be seen from the lost motion connection between link 107 and bell crank arm 108 that the entry retaining device may be pushed into position when the latch 106 will ride over the plate 103 and finally settle into the notch 104 of said plate and that when shaft 33 is given its rotation in the operation of the machine, the cut away portion of the cam disk 112 will finally reach the anti-friction roller 111 and allow a spring to rock the bell crank arm 108 around its pivot 110, thereby raising the latch 106 to release the entry retaining device. The latch 103 is provided with an upwardly extending integral lug 114 which coöperates with the parts directly above it to form what may be termed an error device which will be hereinafter described.

It will be remembered that the operation of the machine as thus far indicated comprises the insertion of the entry retaining device in the machine, the transfer of the amount thereon to the accumulating wheels of the sub-counter and the further movement of the accumulating wheels in correspondence with the movement of their operating racks as determined by the amount keys of the machine. The next part of the operation comprises the transfer of the amount on the accumulating wheels to the entry retaining slides and this may now be described. It will be seen from the shape of cam groove 91 as shown in Fig. 4 that the sub-counter is normally in its upper position and is depressed into gear with the rack segments 83 and then raised for further operation into gear with the racks 43 or 44. After this operation the sub-counter is again depressed into gear with the segments 83, but this time the movement of the said segments when in gear with the sub-counter accumulating wheels is in an opposite direction to the first movement and will therefore in all cases reset the accumulating wheels to their normal or zero position. When the angle piece 69 moves forwardly tensioning the springs 66, the denominational slides 61 will move carrying the segments 83 and restoring the accumulating wheels 85 until the transfer pins 116 of the accumulating wheels engage an upstanding zero projection which forms part of the error device when the wheels will be stopped, thereby stopping the segments 83 and the denominational slides 61, though permitting further movement of the angle piece 69 with the consequent tensioning of the springs 66. As the denominational slides 52 of the entry retaining device have been released by the plunger 91ᵃ, the slides will move when engaged by the denominational slides 61 to a position indicating the new amount, and clearly the printing segments 84 will have set up the proper printing type for the new amount at the printing line. The slides in the entry retaining device may now be locked in their adjusted positions and this is done by permitting the lowering of the plunger 91ᵃ which admits the restoration to normal position of the locking plate 56 in the retaining device, this operation being caused by the forward movement of the part 99 under the influence of the roller 98 which releases the tension of spring 101 and allows the slide 97 to move forwardly.

The mechanism is now in position to print the record of the transaction on a strip and a check or slip and this is done by moving a platen against the papers to carry them into contact with the type segments, an inking ribbon 121 supplying material for printing on the strip and check. The detail strip which is to be retained in the machine is carried on a supply roller 122 and passes from said roller over two small rollers 123 and 124 to a winding roller 125, all of said rollers as shown in Fig. 3 being carried on a unitary frame. The check strip is supplied from a check roll 126 passing from thence to a chute 127, between feeding and printing rollers and finally over the platen. The printing rollers 128 and 129 carry any printing media which may be desired, such for example as consecutive numbering and dating wheels and electrotypes for printing any additional matter, as an advertisement of the establishment in which the machine is used, on both sides of the check strip the printing rollers and the feeding rollers are given a complete rotation at each operation of the machine in the usual well known manner. For certain classes of transactions it is desirable to print on a slip instead of issuing a check and there is provided a sliding table 131 on which a slip may be placed and pushed into the machine or automatically drawn in by the machine as desired. This operation is described in the prior application and need not be here repeated.

To take an impression on the record strip and check strip, the sliding platen carrier 132 is provided mounted to ride vertically on pins 133 and 133ª carried by the detail strip frame. This carrier 132 is provided with a platen 134 at the top and a roller 135 at the bottom against which engages a platen lever 136 pivoted on a pin 137 and having connected thereto at its rear end a vertical sliding arm 138 which is shown broken away in Fig. 6. This arm 138 is slotted to slide on shaft 33 and is arranged to be elevated twice at each operation by a cam groove 139 and projections 140 and 141 of a cam disk 142 carried rigidly by shaft 33. The sliding arm 138 is provided with an anti-friction roller 143 and a flange 144, the roller riding in the cam groove 139 and the flange engaging the peripheral surface and the projections 140 and 141 of the disk. When the disk 142 is rotated the projection 140 will finally engage the flange 144 and raise the same, and when the projection 140 finally passes beyond the flange 144 the heavy spring 145 will quickly draw the arm 138 downward, thereby elevating the platen 133 against the type segments 84 and making an impression. The operation is repeated by the projection 141 when it engages the flange 144, the shape of the cam groove being such as to permit the sudden depression of the connecting arm 138. The first impression is intended to be given to the check or slip and this is carried out of the way before the second impression, so that the second impression takes place on the detail strip which is retained in the machine.

The mechanism as thus far described is substantially complete and practically operative, but some devices, which may be called precautionary devices are desired to prevent any possible manipulations of the machine. For example it might be that the accumulating wheels 85 would for some reason fail to return completely to normal position, and if such was the case the entry retaining device would be withdrawn from the machine without having added the correct amount set up therein. To avoid this possible error there is provided what has been termed an error device which will positively prevent the release of the latch 106 and will consequently prevent the withdrawal of the entry retaining device until all the accumulating wheels 85 have been completely restored to zero position. This mechanism is shown in Figs. 3, 5 and 10 and comprises means under the control of the accumulating wheels 85 for preventing the raising of the latch 106. Mounted on pins 171 and 172 are a series of sliding bars 173 pushed rearward by springs 174 confined between projections on said bars and a frame piece 175. The bars 173 are equal in number to the denominational slides of the entry retaining device and are each provided at their rearward ends with up standing projections 176 which are in the path of the transfer pins 116 of the accumulating wheels 85 when the sub-counter is in its lower position only. The pin 172 which carries the sliding bars 173 is really a shaft, having a depending arm 177 in the path of the entry retaining device, and is also provided with a series of projecting pins 178 engaging flanges 179 on the sliding bars 173. The mechanism is shown in normal position in Fig. 10 and it will be seen that notches 180 in the slides 173 are normally over the vertical projection 114 of the latch 106, so that the latch may be elevated as the entry retaining device is inserted in the machine. The latch 106 is normally held by the anti-friction roller 181 on the depending arm 177 so that the top of the projection 114 barely engages the notches 180 to prevent rearward movement of the slides 173. When the entry retaining device is inserted the arm 177 will be rocked about its shaft 172 and the anti-friction roller 181 will ride rearwardly over the latch 106 until the arm 177 reaches the position of Fig. 5. When the latch 106 drops into the notch 104 of a retaining device, the slides 173 will be released by the said latch and would move rearwardly except for the flanges 179 on the slides which are still engaged by pins 178, but as the retaining device reaches its complete inward position the pins 178 will pass beyond the flanges 179 and springs 174 will then throw the slides 173 rearwardly to the position of Fig. 5, thereby locking the latch 106 in its lower position and positively preventing withdrawal of the entry retaining device. When the sub-counter accumulating wheels 85 are reset the final movement of the wheels will cause the transfer pins 116 to engage the up standing projections 176 of the slides 173 and move the slides forwardly against the tension of their springs 174 until the notches 180 are over the projection 114 of the latch 106. It will be remembered that the latch can only be raised when the cut away portion of disk 112 has reached the anti-friction roller 111 and at this time the spring will lower the bell crank arm 108, thereby raising the latch 106 and releasing the entry retaining device. As the entry retaining device moves outwardly the arm 177 will rock around its shaft 172, thereby moving the pins 178 up into position engaging the flanges 179 of the slides 173 and again retaining them in the position of Fig. 10. It will be seen that the slides 173 are equal in number to the sub-counter accumulating wheels 85 and are operated entirely independently of each other, but that the operation of all of them is necessary before the entry retaining device may be withdrawn. From this construction it clearly follows that if any one of the sub counter wheels has not been completely restored to zero position the entry retaining device cannot be withdrawn from the machine but will be positively locked therein.

If the entry retaining devices are used, for example, to carry the credit accounts of separate customers it is necessary to provide means whereby a subtraction instead of an addition may be made on the said devices when the customer pays money on account, inasmuch as such payment clearly leaves a smaller amount due than was previously owing. To perform this function is the object of the two sets of racks 43 and 44 which move in opposite directions and which may therefore be used to add or subtract at will, it being merely necessary to cause an operative relation between the sub-counter wheels 85 and either one of the sets of racks. In the prior application this object is obtained by moving laterally the two sets of racks, but it is simpler to move the sub-counter laterally and mechanism for doing this is provided in the present case.

Fig. 9 shows the bank of transaction keys, and as shown three subtraction keys are provided which are adapted to engage by their pins 201 with cam slots 202 in a sliding plate 203. This plate is provided with a pin 204 serving to move one arm 205 of a bell crank lever pivoted on a pin 206 on the machine frame, and the other arm 207 of which carries a pin 208 riding in a slot 209 in a rack carrying bar 210. The position of the parts in Fig. 9 is the normal position and it will be seen when one of the subtracting keys is depressed and the plate 203 elevated that the rack bar 210 will be also elevated by the rocking of the bell crank lever around shaft 206. The disk 212 is loosely mounted on the sleeve 86$^a$, which sleeve also supports the sub-counter wheels 85, said disk having teeth 211 and a flat portion adapted to engage the flat portion of the rack bar 210, but the engagement of teeth 211 with the rack on the bar 210 does not occur until the sub-counter wheels 85 are lowered into gear with racks 83. The disk 212 is provided with camming flanges 213 also shown in Fig. 7 adapted to engage an anti-friction roller 214 on a vertical bar 215 and thereby slide the sleeve 86$^a$ laterally on the shaft 86 when the disk is rotated. The rack bar 210 is adapted to move forwardly and reversely at each operation through connection with the levers 71 which operate the denominational slides 61 and it will be seen from the shape of the cam groove in Fig. 9 that the rack bar 210 will be thrown forwardly immediately after the commencement of rotation of shaft 33. If at this time the rack bar 210 has been elevated the rack teeth thereof will soon engage with the teeth 211 of disk 212 and rotate the same enough so that the flange 213 will slide the sleeve 86$^a$ laterally enough to bring the sub-counter wheels 85 under the subtracting set of racks. It will be noted from the relative positions of the cam grooves in Figs. 9 and 4 that this shifting occurs after the sub-counter wheels 85 have been depressed into gear with the rack segments 83 and as it will be remembered that the rack segments 83 when first operated carry the sub-counter wheels forwardly, it will be seen that this shifting of the sub-counter wheels takes place while they are being rotated and while they are in gear with the segments 83 which are made wide enough to gear with the sub-counter wheels in either of the positions of said wheels. The shifting of the sub-counter wheels while moving with the segments is of advantage inasmuch as it gives much less friction than if the segment racks were stationary, and furthermore it would be impracticable to shift the subcounter wheels while they are in their upper position in gear with the adding and subtracting racks, as this operation would necessitate the beveling of teeth on the racks and sub-counter wheels but it would be practically impossible to bevel such thin racks and wheels. The shifting of the wheels while in gear with the segment racks takes place easily and with little friction and does away with any necessity of beveling the teeth. It will be readily understood that if no substracting key is pressed in the rack 210 will nevertheless be reciprocated but will be in such a position that the teeth thereof will not gear with the teeth on disk 212 and consequently will not cause a shifting of the sleeve 86ª. The sub-counter wheels and the shaft 86 are shown in Fig. 7 and it will be seen that the wheels 85 are supported in depressions in the sleeve 86ª surrounding said shaft. The disk 212 engages the frame piece 87 and maintains a constant position as far as lateral movement is concerned. When the disk is rotated the cams 213 engage the anti-friction rollers 214 and slide the sleeve 86ª laterally against the tension of a spring 231 confined between a projection on the sleeve and the frame piece 87 so that the spring 231 constantly tends to reset the sub-counter wheels to their adding position and will do so as soon as the cams 213 are moved away from contact with the rollers 214.

As is usual in cash registers the operating mechanism is normally locked and is only released when certain of the keys are depressed. The machine lock in this case is intended to be released by the depression of one of the initial or clerk's keys a bank of which is shown in Fig. 1. When any key 15 is depressed the detent 18 is raised and the detent plate 19 finally springs rearward under tension of its spring 20. Pivoted at its forward end to the detent plate 19 is a link 241 provided at the rear end thereof with a bayonet slot engaging a pin on an arm 242 rigidly mounted on a shaft 243 and arranged to move rearwardly a detent arm 244 also mounted on the shaft 243 and normally drawn forwardly by a spring 245. This detent arm 244 engages under a flange 246 on an arm 247 which is rigidly mounted on a line lock shaft 248. Also rigidly mounted on this shaft 248 is a locking arm 249 (see Fig. 2) having a projection 250 engaging a cam 251 on an operating shaft 25 which is geared to operate main shaft 33. The locking arm 249 at its rearward end is connected to a spring 253 normally tending to draw the locking arm downward to a releasing position, but clearly this releasing movement is prevented by the engagement of flange 246 on arm 247 with the locking detent 244. When, however, the initial key is depressed the detent 244 moves rearwardly and releases the arm 247, when the spring 253 may immediately draw down the locking arm 249, thereby withdrawing the projection 250 from the cam 251 and releasing the machine. The locking arm 249 is positively restored to normal locking position by the anti-friction roller 254 mounted on the operating gear on shaft 33 which finally engages the curved part 255 of the locking arm 249 and raises the same enough to allow the detent 244 again to pass under flange 246 and lock the operating mechanism.

It is desirable to compel the depression of whatever amount of keys are to be used in advance of the depression of the initial key and furthermore to prevent a continued repetition of operations of the machine by retaining the amount keys in depressed position. To accomplish these functions the detents of the amount keys banks, one of which is shown in outline in Fig. 2, and which are similar to the detent 18 of the initial key bank, are each provided near the top thereof with a lug 261 which when the detent is raised by the depression of a key, rock latches 262 pivoted on the locking arm 249 or on other arms 249ª. (see Fig. 1) having a similar position to the said arm 249 and also carried by shaft 248, the said latches being normally pressed by springs 263 against pins on the arms supporting them. It will be clear that when the amount key detents are raised their projections 261 will rock the latches 262 about their pivots and that they will therefore offer no obstruction to the raising of the detents when the machine latch is released. If, however, an amount key is retained in depressed position between operations of the machine, the latch 262 corresponding to the amount key will when the locking arm 249 is restored to locking position snap past the projection 261 of the amount key detent and finally pass under said projection so that if the initial key is again pressed to release the machine the latch 262 will engage the elevated projection 261 and prevent the unlocking movement of arm 249. The only means of correcting this misoperation will be to release the amount key detent and depress the amount key again before the depression of the initial key. The locking arm 249 and the arms 249ª also carry latches 271 which when the locking arm 249 is moved to releasing position are elevated into the path of the projections 261 on the amount key detents. It will readily be seen that these latches prevent operation of an amount key after the initial key has been operated inasmuch as the operation of an amount key necessitates a raising of the detent plate for the particular bank operated, but such raising is entirely prevented by the pawl 271 being in the path of the projection 261 of the key detent. If the amount keys are depressed, first the depression of an initial key will release the locking arm 249 and allow it to rock around its pivot shaft but in this case the latches 271 will engage under the projections 261 and merely rock around their pivots on their supporting arms.

A misoperation of the machine may result, especially if the machine is electrically driven, by the partial depression of a transaction key followed by the complete depression of an initial key inasmuch as the initial key releases the machine and the operating handle can then be turned. Such misoperation is prevented by providing mechanism which serves to obstruct the movement of the initial keys, while the transaction key is in partially operated position, but without necessitating the depression of an initial key. Referring to Fig. 8 it will be seen that this figure shows the bank of transaction keys and a cam plate adapted to be operated thereby. This cam plate is similar to the plate 203 except that cam notches are provided for each of the keys so that depression of any transaction key will elevate the said plate 281, thereby rocking a bell crank lever 282 around its pivot 283 from the full line position to the dotted line position, and thereby carrying a flange 284 on said lever past the projection 261 of the key detent 18. For the purpose of clearness, Fig. 8 has been drawn as if the key detent 18 was arranged for operation by the transaction bank of keys, but it will be understood that the bell crank lever 282 is really composed of two separate arms, both rigidly mounted on the shaft 283 but having a considerable expanse of shaft between them, inasmuch as the short arm of the lever is near the transaction bank, whereas the long arm of the lever is in the plane of the initial bank. It will be clearly seen that the movement of the initial key is not prevented if the transaction key remains in normal position, inasmuch as the projection 261 of the key detent 18 may readily pass the flange 284, nor is the movement of the initial key prevented if the transaction key is completely depressed, for under this condition the bell crank 282 will have been moved to the dotted line position and the flange 284 passed completely by the projection 261. If, however, the transaction key is partly operated the flange 284 will be directly in the path of projection 261 and will thereby prevent the depression of the initial key until the transaction key is either allowed to move to normal outward position or completely depressed. This mechanism is very simple but provides an adequate and satisfactory preventitive for the misoperation referred to.

A transfer, acting either in an adding or subtracting direction, is provided for the sub-counter wheels 85. This mechanism is similar to that shown in the prior application and may be described briefly by saying that the wheels 85 are provided with pins 116 adapted to trip pawls 301 (Fig. 3) thereby allowing springs 302 to depress pawls 303 into position to engage ratchet teeth 304 on the adding rack bars 44, these pawls 303 being carried by bars 305 connected to lever arms 306 pivoted on a rod 307 and actuated by cam projections successively arranged around and moved with shaft 33. Only one set of pawls 303 are provided for both adding and subtracting transfers. The pawls 303 are reset by bars 308 having flanges 309 engaging projections on said pawls when the bars 308 are moved rearwardly by lever arms 71 to which they are connected. Springs 310 serve to reset the trip pawls 304 to normal central position from which they may be oscillated in either direction by pins 116.

A series of three slides corresponding in shape to slides 61 and adapted to engage with the clerk's slides 53, are provided and have cut in them series of notches 311 (Fig. 5) into which an alining and locking device 312 is adapted to move. This device is carried by arms 313 which are rocked with bell crank lever 94—95, so that during the time the plunger 91ª has released the amount slides 52 the clerk's slides in the machine are locked with their printing segments in position to print the clerk's number on the record papers. After the printing has taken place the clerk's slides are released by elevation of arm 313 and the springs 68 then reset the slides to normal position.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows:

1. In a machine of the class described, the combination with two banks of keys, of a plate for each bank constructed to be moved by the operation of any key of its respective bank, and an arm operated by one of said plates positioned to prevent movement of the other plate during the stroke of said arm.

2. In a machine of the class described, the combination with two banks of keys, of a detent for each bank moved by the keys of its respective bank, and means operated by one of the detents for preventing operation of the other detent when the first detent is in a partially operated position.

3. In a machine of the class described, the combination with two banks of keys, of a detent for one of said banks, a plate moved by any key in the other of said banks, and means controlled by said plate for blocking said detents during the complete operation of any of the keys controlling said plate.

4. In a machine of the class described, the combination with a bank of initial keys, a plate moved by the depression of said keys and carrying a projection, transaction keys, and a plate operated by the depression of said transaction keys, of means adjusted by the movement of the transaction plate for preventing movement of the initial keys during a partial depression of a transaction key and permitting such movement upon a full depression of said key.

5. In a machine of the class described, the combination with a key and an element operated thereby, of a second key and a plate actuated by said second key, with connections operated by said plate for blocking said key operated element during movement of said plate.

6. In a machine of the class described, the combination with a bank of amount keys and a bank of special keys, an operating mechanism, means for locking same, and means controlled by said special keys for releasing said locking mechanism; of means controlled by the amount keys for preventing an operation of a special key throughout the operating movement of an amount key and means for preventing operation of said amount keys after the locking mechanism is released.

7. In a machine of the class described, the combination with a bank of amount keys and a bank of special keys, of an operating mechanism, means for locking same, and means controlled by said special keys for releasing said locking means, of a detent operated by the amount keys, means controlled by said detent for preventing an operation of a special key throughout the operating movement of the detent and means preventing the operation of said detent after the locking means has been released.

8. In a machine of the class described, the combination with a bank of amount keys and a bank of special keys, of a plate common to and operated by any key of the amount bank, and connections caused to operate by any key of the special bank for preventing movement of said plate and thereby preventing actuation of any amount key.

9. In a machine of the class described, the combination with an amount key and a special key, of a detent operated by said amount key, and means controlled thereby for preventing an operation of the special key throughout the operating movement of the amount key, means for locking said detent against movement, and means caused to operate by the actuation of the special key, for moving said locking means to locking position.

10. In a machine of the class described, the combination with a bank of amount keys, and a bank of special keys, of a detent for the amount keys, and spring operated means released by the operation of the special keys for preventing operation of said detent.

11. In a machine of the class described, the combination with a bank of amount keys, and a special key, of an operating mechanism, means normally locking said mechanism, and released by an operation of the special key, means controlled by the amount keys for preventing the release of said locking mechanism by the special key throughout the operating movement of an amount key, and means operated by the movement of said locking means to releasing position, for preventing subsequent operation of said amount keys.

12. In a machine of the class described, the combination with a bank of amount keys, and a special key, of an operating mechanism and means normally locking same, means operated by said special key for releasing said locking means, a detent for the amount keys, means controlled by said detent for preventing an operation of the special key throughout the operating movement of the detent, and means movable with said locking means for preventing movement of said detent after the locking means has been released.

13. In a machine of the class described, the combination with a bank of keys, an operating mechanism and means releasable by an operation of said keys for normally locking said mechanism; of means for preventing a second release of said locking means by retaining said keys in operated position.

14. In a machine of the class described, the combination with an operating mechanism, means normally locking same, a bank of keys and means operated thereby for releasing said locking means; of means for positively restoring said locking means to locking position, and means preventing a second release of said locking means without an intervening restoration of said keys to normal position.

15. In a machine of the class described, the combination with an operating mechanism, means normally locking same, a bank of keys, means operated thereby for releasing said locking means, and a key detent; of means carried by said detent for preventing a second release of said locking means until said keys have been first restored to normal position.

16. In a machine of the class described, the combination with a bank of keys, a detent for said keys, a sliding plate holding said detent in adjusted position, operating mechanism, and means normally locking same, of means operated by said sliding plate for releasing said locking means when said keys are depressed.

17. In a machine of the class described, the combination with an operating mechanism, means normally locking same, a bank of keys, a detent therefor, and a sliding plate spring-adjusted to retain said detent in operated position; of means operated by the spring adjusted movement of said plate for controlling said locking means.

18. In an adding and subtracting machine, the combination with a series of accumulating wheels, of two sets of racks side by side for operating said wheels, gearing connecting the racks of one set to those of the other set such that the sets move in opposite directions, a subtracting key, and means controlled by said key for shifting said wheels laterally to bring them into operative relation with said racks.

19. In an adding and subtracting machine, the combination with a series of accumulating wheels, of racks geared to move in opposite directions for actuating said wheels, a subtracting key, and means controlled by said key for laterally shifting said wheels to bring them in mesh with said racks.

20. In an adding and subtracting machine, the combination with a series of accumulating wheels, of racks geared to move in opposite direction for actuating said wheels, a subtracting key, means controlled by said key for laterally shifting said wheels to bring the wheels into operative relation with the racks, and a spring for returning the wheels to normal position.

21. In an adding and subtracting machine, the combination with a series of accumulating wheels, of sets of racks movable in opposite directions for operating same, means for shifting said wheels to bring them into operative relation with a desired set of racks, and transfer devices for moving said racks an additional step, said transfer devices acting directly on one set of racks only.

22. In an adding and subtracting machine, the combination with a series of accumulating wheels, of sets of racks movable in opposite directions for operating said wheels, means for shifting said wheels to determine which set of racks shall operate said wheels, transfer devices operated by rotation of said wheels in either direction, and means for actuating said racks an additional step to effect the transfers.

23. In an adding and subtracting machine, the combination with an operating mechanism and differentially movable racks actuated thereby, a sub-counter operated by said racks, a removable entry retaining device, and means for transferring the entry on the sub-counter to said device; of means preventing removal of said entry retaining device until the sub-counter occupies a certain position.

24. In an adding and subtracting machine, the combination with an operating mechanism, a series of elements differentially adjusted thereby, a sub-counter operated by said elements, a removable entry retaining device, and means for setting the sub-counter to zero and thereby entering an amount on said retaining device; of means preventing the removal of said retaining device until said sub-counter is completely restored to zero.

25. In an adding and subtracting machine, the combination with an operating mechanism, a series of elements differentially adjusted thereby, a sub-counter operated by said elements, a removable entry retaining device, means for transferring the entry on the sub-counter to said retaining device, and a latch for said device; of means preventing the release of said latch controlled by said sub-counter.

26. In an adding and subtracting machine, the combination with an operating mechanism, a sub-counter controlled therefrom, a removable entry retaining device, means for resetting said sub-counter to zero and thereby transferring the amount thereon to said retaining device, and means preventing removal of said device, of devices operated by said sub-counter when the same is completely reset for releasing said preventing means.

27. In an adding and subtracting machine, the combination with an operating mechanism, a sub-counter differentially adjusted thereby, a removable entry retaining device, means for transferring to said retaining device the entry on said sub-counter, and a latch for said retaining device; of means for holding said latch against release arranged to be withdrawn from holding position only when the entry has been completely transferred to said retaining device.

28. In a machine of the class described, the combination with an initial key and a transaction key, an operating mechanism for the movable parts of the machine with connections under the control of the initial key for normally locking said operating mechanism, and a detent element actuated by said initial key; of a plate operated by said transaction key, and connections whereby said detent is prevented from operation during movement of said plate.

29. In a machine of the class described, the combination with an initial and a transaction key, an operating mechanism for the movable parts of the machine, means controlled by the initial key normally locking said operating mechanism, and a detent plate operated by said initial key; of a plate actuated by said transaction key, and an element controlled thereby and moved during the stroke of said transaction key across the path of a part of said detent plate.

30. In a machine of the class described, the combination with an amount and an initial key, an operating mechanism for the movable parts of the machine, spring operated devices for normally locking said operating mechanism, and means actuated by said initial key normally preventing releasing movement of said spring operated devices; of means caused to operate by movement of said initial key for preventing actuation of said amount key.

31. In a machine of the class described, the combination with an operating mechanism, of means normally locking same, and a spring for moving said locking means to releasing position, manipulative item determining devices, and an element movable with said locking means for preventing actuation of said manipulative devices.

32. In a machine of the class described, the combination with a plurality of manipulative devices having differing functions, devices intermediate one class of said manipulative devices and the other class of said manipulative devices whereby an operation of the latter is prevented through the operating movement of the former, an operating mechanism for movable parts of the machine, means normally locking said operating mechanism against operation, and connections whereby actuation of one of said last mentioned manipulative devices causes release of said locking means; of devices actuated by the movement of said locking means to releasing position for preventing subsequent actuation of the first mentioned manipulative devices.

33. In a machine of the class described, the combination with a manipulative device and a detent for holding it in depressed position, of an operating mechanism for movable parts of the machine, spring operated locking devices for said operating mechanism with means normally holding said locking devices in locking position against the spring tension, means for releasing said holding means to permit said locking devices to release, and an element moved with said locking devices into the path of a part of said detent.

34. In a machine of the class described, the combination with a main operating mechanism, of a spring operated latch for same, means for releasing said latch, manipulative devices for determining the characteristics of transactions entered in the machine, and an element moved by the release of said latch and when moved preventing subsequent actuation of said manipulative devices.

35. In a machine of the class described, the combination with a main operating mechanism, of a locking device for same, resilient means normally tending to move said locking device to releasing position, means for holding said locking device positively in locking position, and a key and connections controlled thereby for withdrawing said holding means from holding position.

36. In a machine of the class described, the combination with a main operating mechanism, of a locking device for same, resilient means normally tending to move said locking device to releasing position, a latch for holding said locking device positively in locking position, a key and connections controlled thereby for withdrawing said holding latch from holding position, and means actuated from said operating mechanism for restoring said locking device to locking position.

37. In a machine of the class described, the combination with a main operating mechanism of a locking device for same, with resilient means constantly tending to move said locking device to releasing position, means for positively holding said locking device in holding, a manipulative device, and a detent for said manipulative device actuated by said device and when so actuated serving to withdraw said holding means from holding position.

In testimony whereof I affix my signature in the presence of two witnesses.

EDMUND S. CHURCH.

Witnesses:
J. B. HAYWARD,
R. C. GLASS.

---

Copies of this patent may be obtained for five cents each, by addressing the "Commissioner of Patents, Washington, D. C."